D. A. Woodward,
Camera.
No. 2,311. Reissued July 10, 1866.
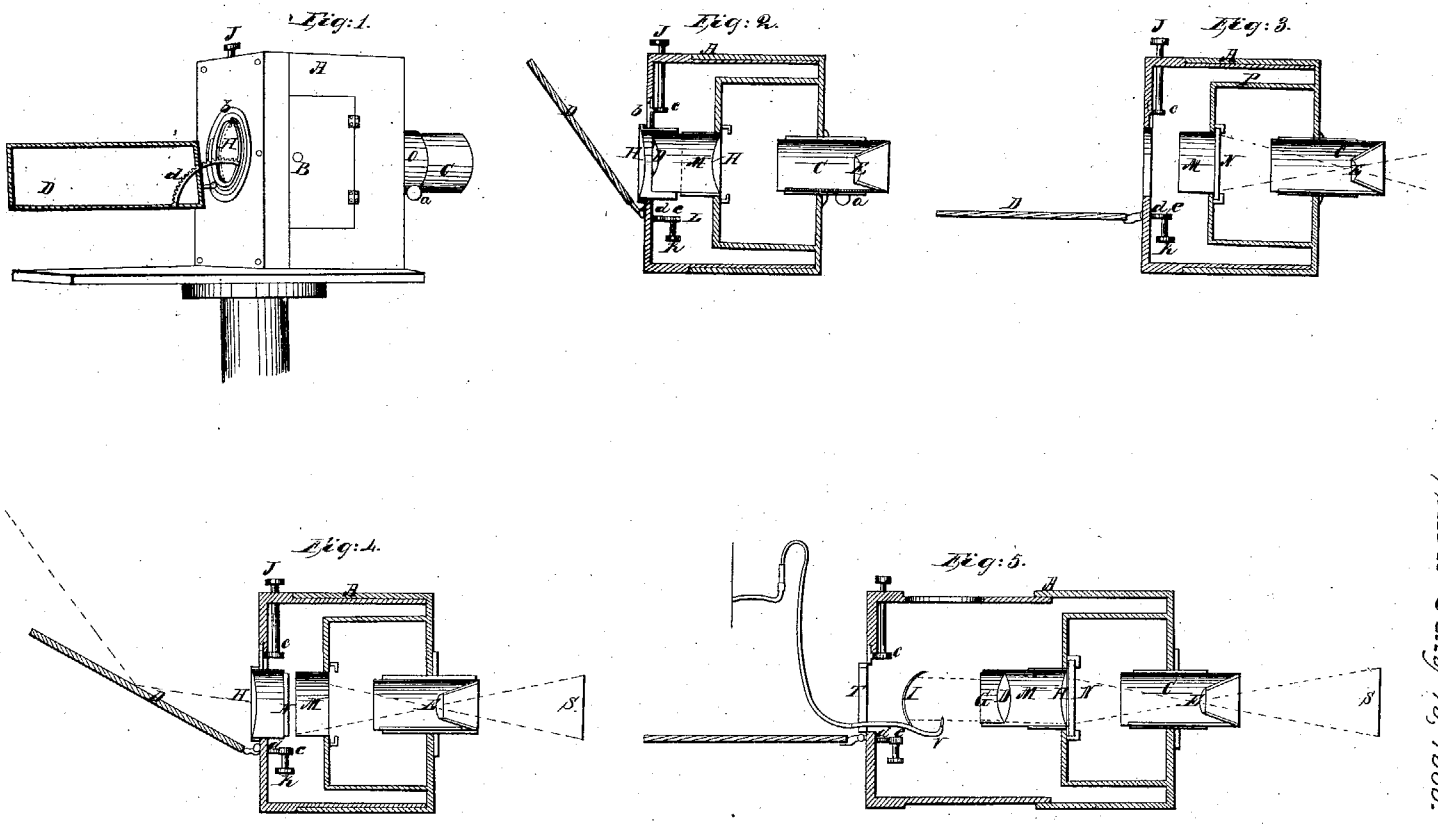

UNITED STATES PATENT OFFICE.

DAVID A. WOODWARD, OF BALTIMORE, MARYLAND.

SOLAR CAMERA.

Specification forming part of Letters Patent No. 16,700, dated February 24, 1857; Reissue No. 2,311, dated July 10, 1866.

*To all whom it may concern:*

Be it known that I, DAVID A. WOODWARD, of the city and county of Baltimore, and State of Maryland, have invented a new and useful Instrument which I call a "Solar Camera," of which the following is a full, clear, and exact description, reference being had to the accompanying drawings through letters of reference marked thereon, forming part of this specification, and in which—

Figure 1 represents a perspective view of my instrument; Fig. 2, a vertical longitudinal section of the same; Fig. 3, a similar section, showing the instrument as used for photographing, constituting the common camera-obscura. Fig. 4 shows the instrument as used for throwing the object to be traced, painted, or photographed on a canvas or other suitable material by the transmitted light from the sun. Fig. 5 represents a sectional view of the instrument as used for the last-named purpose by transmitting artificial light.

The same letters occurring in the several figures indicate corresponding parts.

The object of my invention is, first, to furnish the artist or draftsman with an instrument by which he may be enabled to produce an accurate image of the object to be delineated by photography, and that will afterward portray on his canvas or other material an infallible representation thereof in light and shade, whereby a most accurate likeness or copy of any desired size may be produced, requiring only one sitting of the subject; and, secondly, to enable the photographic artist to print a picture on prepared paper, canvas, or other material of greater or less dimensions than those of the negative ordinarily used for such purpose, whereby he is enabled to use a more perfect negative produced by bringing the entire field of his picture within the focus of his instrument, and afterward throwing it up and printing it by concentrating the rays of light through the negative in the instrument and focusing the object on the prepared paper or canvas, instead of printing by superposition in the usual way.

To enable others skilled in the art to understand the construction and operation of my invention, I will proceed to describe it by referring to the drawings.

A represents the box of an ordinary camera-obscura or photographic camera, constructed with a slide for the purpose of focusing when used for throwing the picture on a distant object, which will be hereinafter more fully described, and to which is adapted a sliding tube, *c*, holding an achromatic lens or combination of lenses, which is focused by means of a rack and pinion, *a*.

Within the box A is a dark-chamber, P, fitted with slides or grooves to receive the sheath N, in which the glass or other plate on which the picture is to be taken is supported. This chamber P may also be made to slide in the same manner as the box A, for focusing when a tube without the rack-and-pinion motion is to be used, or when that amount of motion is insufficient, thus forming a complete and perfect camera-obscura, by which the negative picture on glass is first produced by any known process for that purpose, and which may afterward be copied in a similar manner by placing it between the instrument and the light to produce a picture that is positive when seen by transmitted light. This part of the process being completed, I transform the camera-obscura into a new instrument, which I call the "solar camera," by adapting to it a luminating-lens, H, as shown in Fig. 4, similar to that used in the solar microscope, for which purpose I use a plano-convex lens adapted to the rear end of the camera-box on a line with the axis of the achromatic lens E, and in rear of this luminating-lens H, I attach a mirror or reflector, D, so that when the direct rays of the sun cannot be brought to bear on the instrument they may be reflected through the negative. This reflector is supported on a circular collar, *b*, encompassing the luminating-lens H. On the inner side of this coller is a rack with a pinion, *c*, gearing into it, which is operated by the mill-head J.

To one side of the reflector is attached a segment-rack, *d*, which passes through by the side of the lens H and gears into the pinion *e*, which is operated by the mill-head K, by which, together with the pinion *c* gearing into the circular rack, the reflector is brought to any necessary position to receive the sun's rays and reflect them through the instrument. This being done, the positive picture before mentioned is placed in the holder N in front of the luminating-lens H, when the rays of light passing through it and the achromatic lens E throw the picture on the canvas, which is supported on a suitable holder at *s*, which may be arranged and focused at such distance as to produce a picture of any desired size to be traced or painted, for which purpose it is not necessary to darken the room, but merely to exclude the direct rays of the sun.

In printing photographic pictures on paper or canvas sensitized by the ordinary ammonia-nitrate-of-silver solution, or any other equivalent preparation, the instrument is placed where the rays of the sun may be received, either direct or reflected, and the negative picture, which has been taken, as before described, by the camera-obscura, is placed in the negative-holder at N, to be focused on the sensitive paper or other material.

In focusing the picture the first thing to be observed is that the achromatic lens E is at or near the focal distance of the luminating-lens from said lens, which is ascertained by observing the spark of light in the center of the lens E. This being adjusted, the size of the picture to be produced is regulated by the position of the negative between the luminating-lens H and the achromatic lens E and the distance at which the object is focused upon the prepared paper on the paper-holder. The greater its distance the larger will be the object on the paper. The requisite distance to produce the desired size being ascertained, the object is brought into focus by adjusting the negative toward or away from the achromatic lens by the sliding arrangement of the camera-box and tube, or of the interior chamber which supports the negative-holder N. By this arrangement a *carte de visite* may be made from a large negative or a life-sized picture from a small negative with the same combination of lenses.

When the print is sufficiently dark, the time required for which is dependent in part on the intensity of the sun's rays and in part on the size of the luminating-lens, it is removed from the paper-holder and toned and fixed in the usual manner.

To adapt the instrument to be used by artificial light I arrange it as represented in Fig. 5, placing the positive or negative picture, as the case may be, in the negative-holder N, with a cylindrical sliding tube, M, containing the luminating-lens H, immediately in rear of the picture and a condensing-lens, D′, in rear of that, with a concave mirror, I, near the rear end of the box, between which and the lens D′ the light is introduced. The aperture occupied by the luminating-lens H in Fig. 4 being closed or darkened, the picture will then be thrown on the canvas or other material on the holder at S, as in the former case.

It will be perfectly obvious that this instrument may be so arranged and constructed as to throw the picture downward or at any desired angle on a table or easel in any position most convenient for the artist and for the reception of the sun's rays, directly or indirectly.

Having thus described my invention, I do not claim the photographing camera-obscura or the solar reflector or lens, or any part thereof, of themselves; but

What I claim as new, and desire to secure by Letters Patent, is—

1. Adapting to the camera-obscura a lens or lenses and reflector in rear of the object-glass in such manner that it is made to answer the twofold purpose of a camera-obscura and a camera-lucida, substantially as and for the purpose specified.

2. The arrangement and combination of the condensing-lens H or lenses D′ and H, negative slide or holder N, and achromatic lens or lenses E, made adjustable with regard to each other for condensing the sun's rays upon and through the negative and focusing them upon prepared paper, canvas, or other suitable material for photographic purposes, substantially as described.

In testimony whereof I hereunto subscribe my name this 8th day of June, 1866, before two subscribing witnesses.

D. A. WOODWARD.

Witnesses:
H. C. FORMAN,
C. P. MEREDITH.